(12) United States Patent
Taguchi et al.

(10) Patent No.: US 12,352,484 B2
(45) Date of Patent: Jul. 8, 2025

(54) HEAT SOURCE UNIT AND REFRIGERATION DEVICE

(71) Applicant: DAIKIN INDUSTRIES, LTD., Osaka (JP)

(72) Inventors: Shuichi Taguchi, Osaka (JP); Masaaki Takegami, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 357 days.

(21) Appl. No.: 17/586,349

(22) Filed: Jan. 27, 2022

(65) Prior Publication Data

US 2022/0146172 A1 May 12, 2022

Related U.S. Application Data

(63) Continuation of application No. PCT/JP2020/025155, filed on Jun. 26, 2020.

(30) Foreign Application Priority Data

Aug. 27, 2019 (JP) .................................. 2019-154544

(51) Int. Cl.
*F25B 49/02* (2006.01)
*F25B 9/00* (2006.01)
(Continued)

(52) U.S. Cl.
CPC ............ *F25B 49/022* (2013.01); *F25B 9/008* (2013.01); *F25B 31/004* (2013.01); *F25B 41/20* (2021.01);
(Continued)

(58) Field of Classification Search
CPC .............. F25B 49/022; F25B 2600/027; F25B 2700/1931
See application file for complete search history.

(56) References Cited

U.S. PATENT DOCUMENTS

| | | | |
|---|---|---|---|
| 2010/0139312 A1* | 6/2010 | Takegami | F25B 13/00 62/513 |
| 2018/0209696 A1* | 7/2018 | Takizawa | F25B 1/10 |
| 2021/0215398 A1* | 7/2021 | Iwata | F25B 41/39 |

FOREIGN PATENT DOCUMENTS

| | | |
|---|---|---|
| JP | 4-281160 A | 10/1992 |
| JP | 4-356665 A | 12/1992 |

(Continued)

OTHER PUBLICATIONS

JP 2002107027 (English translation) (Year: 2002).*

(Continued)

*Primary Examiner* — Jonathan Bradford
(74) *Attorney, Agent, or Firm* — Birch, Stewart, Kolasch & Birch, LLP

(57) ABSTRACT

A heat source unit constitutes a refrigeration apparatus by being connected to a utilization-side unit. The heat source unit includes a low-stage compression element, a high-stage compression element, and a heat exchanger. The low-stage compression element has a discharge pipe provided with a pressure switchgear. The high-stage compression element compresses a refrigerant discharged from the low-stage compression element. When the low-stage compression element is paused in response to activation of the pressure switchgear, the high-stage compression element operates while the low-stage compression element is kept paused.

13 Claims, 9 Drawing Sheets

(51) Int. Cl.
   *F25B 31/00*       (2006.01)
   *F25B 41/20*       (2021.01)
(52) U.S. Cl.
   CPC . *F25B 2309/06* (2013.01); *F25B 2313/02732* (2013.01); *F25B 2400/072* (2013.01); *F25B 2400/13* (2013.01); *F25B 2500/07* (2013.01); *F25B 2600/0261* (2013.01); *F25B 2600/027* (2013.01); *F25B 2700/1931* (2013.01)

(56) References Cited

FOREIGN PATENT DOCUMENTS

| | | |
|---|---|---|
| JP | 2000-161795 A | 6/2000 |
| JP | 2007-327695 A | 12/2007 |
| KR | 10-2012-0114121 A | 10/2012 |

OTHER PUBLICATIONS

Extended European Search Report for European Application No. 20856747.9, dated Jul. 11, 2022.
International Search Report for PCT/JP2020/025155 mailed on Sep. 8, 2020.
Written Opinion of the International Searching Authority for PCT/JP2020/025155 mailed on Sep. 8, 2020.
English translation of International Preliminary Report on Patentability and Written Opinion of the International Searching Authority for International Application No. PCT/JP/2020/025155, dated Mar. 10, 2022.

\* cited by examiner

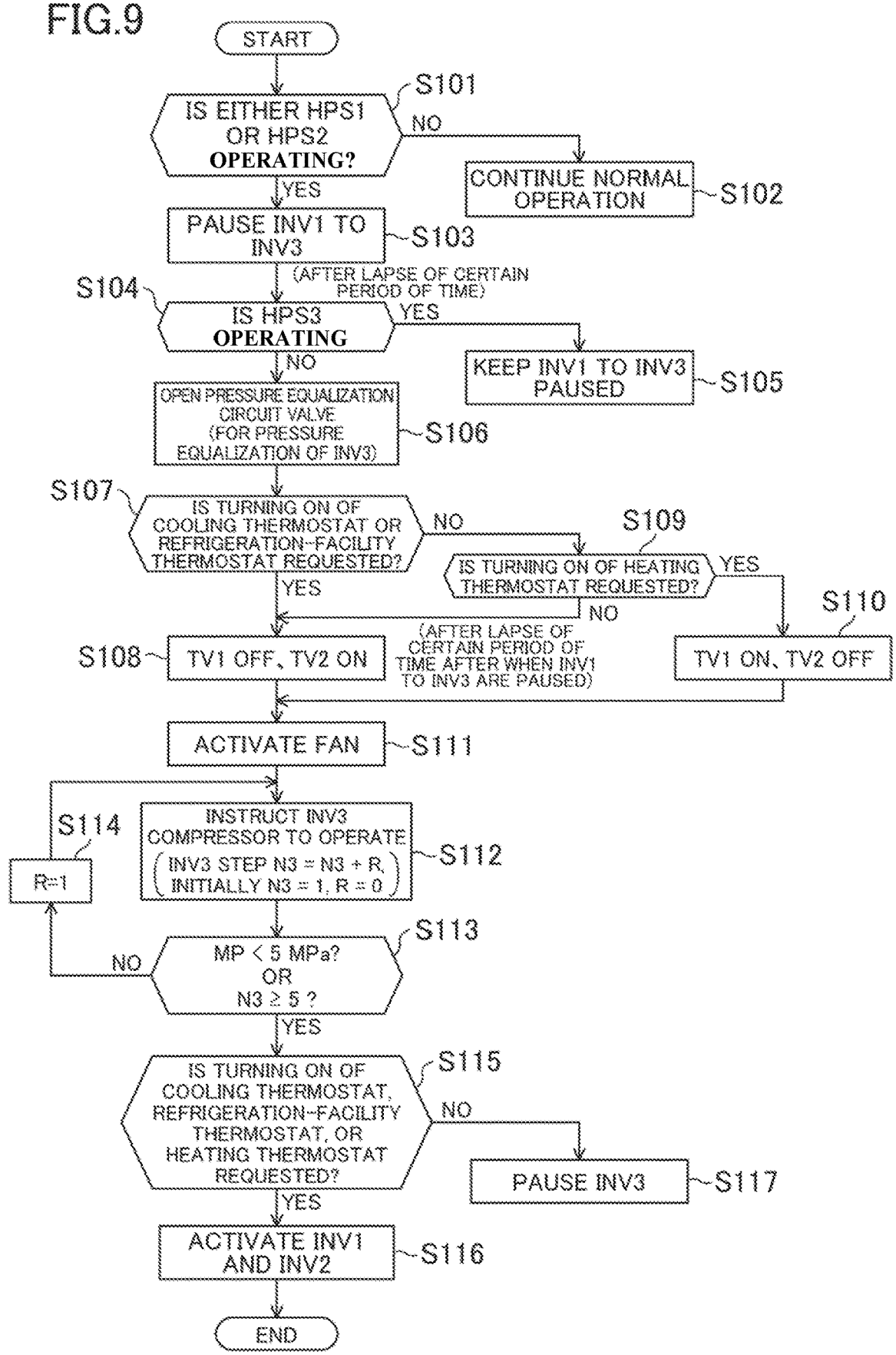

HEAT SOURCE UNIT AND REFRIGERATION DEVICE

CROSS REFERENCE TO RELATED APPLICATIONS

This application is a Continuation of PCT International Application No. PCT/JP2020/025155, filed on Jun. 26, 2020, which claims priority under 35 U.S.C. 119 (a) to Patent Application No. 2019-154544, filed in Japan on Aug. 27, 2019, all of which are hereby expressly incorporated by reference into the present application.

TECHNICAL FIELD

The present disclosure relates to a heat source unit and a refrigeration apparatus.

BACKGROUND ART

Patent Document 1 discloses as follows. In a two-stage compression system constituting a heat source unit of a refrigeration apparatus, discharge pipes of the high-stage compressor and the low-stage compressor are each provided with a high-pressure switchgear (HPS). This reduces damage to the compression system due to an abnormal increase in the pressures of the discharge pipes.

When HPS of the low-stage compressor is activated in such a commonly used heat source unit (external unit), the entire compression system is paused to protect the low-stage compressor from a high-pressure refrigerant.

CITATION LIST

Patent Document

PATENT DOCUMENT 1: Japanese Unexamined Patent Publication No. 2007-327695

SUMMARY

A first aspect of the present disclosure is directed to a heat source unit constituting a refrigeration apparatus (1) by being connected to a utilization-side unit (50, 60). The heat source unit includes: a low-stage compression element (22, 23); a high-stage compression element (21); and a heat exchanger (13). The low-stage compression element (22, 23) has a discharge pipe (22b, 23b) provided with a pressure switchgear (82, 83). The high-stage compression element (21) compresses a refrigerant discharged from the low-stage compression element (22, 23). When the low-stage compression element (22, 23) is paused in response to activation of the pressure switchgear (82, 83), the high-stage compression element (21) operates while the low-stage compression element (22, 23) is kept paused.

BRIEF DESCRIPTION OF THE DRAWINGS

FIG. 9 is a flowchart showing an example of operation from activation of the pressure switchgear of the low-stage compressor in the heat source unit according to the embodiment to restoration of the compression system.

DESCRIPTION OF EMBODIMENTS

An embodiment of the present disclosure will be described below with reference to the drawings. The embodiment below is merely an exemplary one in nature, and is not intended to limit the scope, applications, or use of the invention.

Embodiment

Configuration of Refrigeration Apparatus

Figure 1:
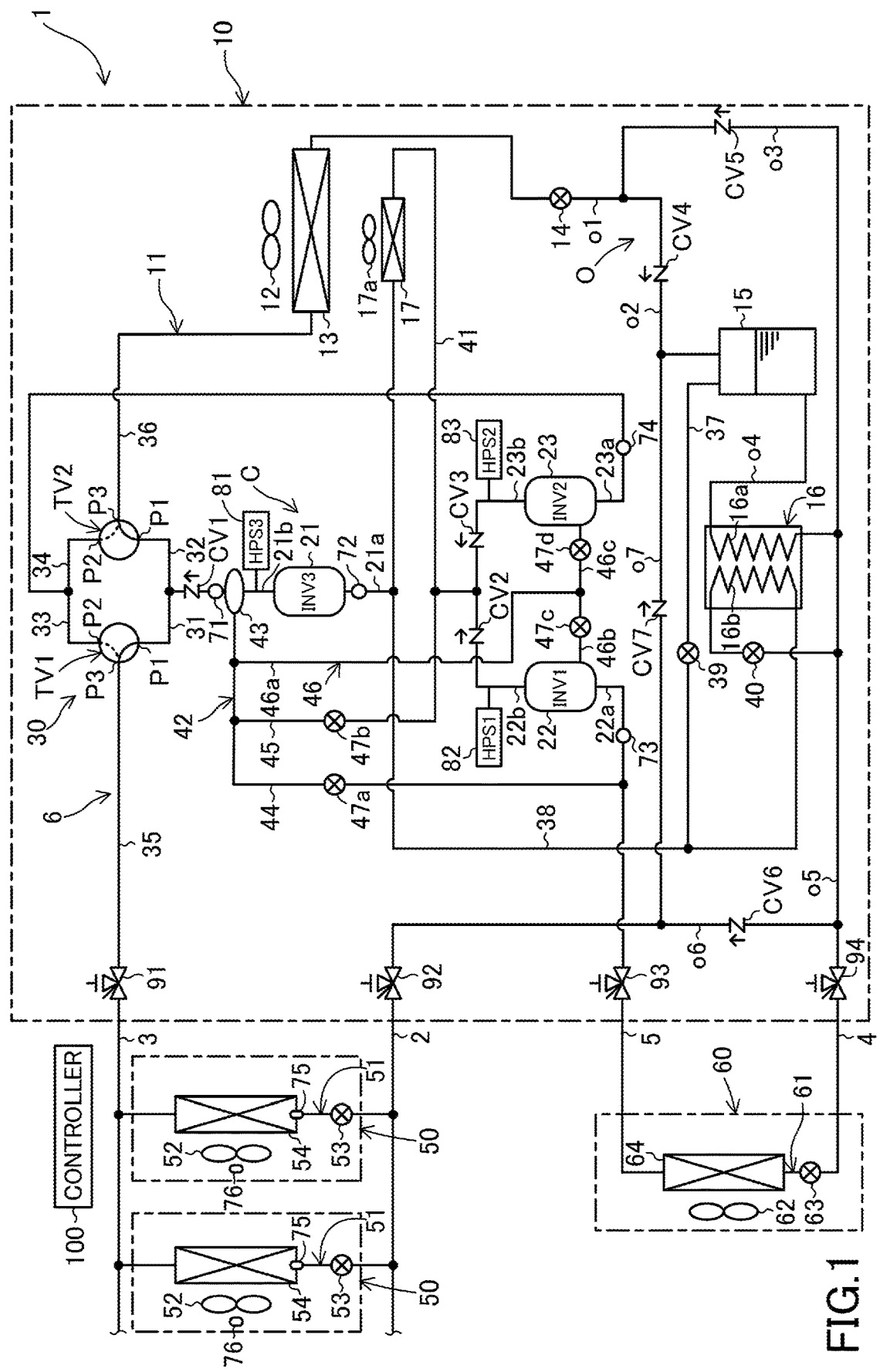
FIG. 1 is a piping system diagram of a refrigeration apparatus including a heat source unit according to an embodiment.

FIG. 1 is a piping system diagram of a refrigeration apparatus (1) including a heat source unit (10) according to an embodiment. The refrigeration apparatus (1) performs cooling of an object to be cooled and air-conditioning of an indoor space in parallel. The object to be cooled herein includes air in facilities such as a refrigerator, a freezer, and a show case. Hereinafter, such facilities are each referred to as a refrigeration-facility.

As illustrated in FIG. 1, the refrigeration apparatus (1) includes a heat source unit (10) placed outside, indoor units (50) configured to perform air-conditioning of an indoor space, a refrigeration-facility unit (60) configured to cool inside air, a controller (100). FIG. 1 shows two indoor units (50) connected to each other in parallel. The refrigeration apparatus (1) may include a single indoor unit (50) or three or more indoor units (50) connected to each other in parallel. FIG. 1 shows a single refrigeration-facility unit (60). The refrigeration apparatus (1) may include two or more refrigeration-facility units (60) connected to each other in parallel. These units (10, 50, 60) are connected to each other via connection pipes (2, 3, 4, 5) to constitute a refrigerant circuit (6).

The four connection pipes (2, 3, 4, 5) consist of a first liquid connection pipe (2), a first gas connection pipe (3), a second liquid connection pipe (4), and a second gas connection pipe (5). The first liquid connection pipe (2) and the first gas connection pipe (3) are associated with the indoor units (50). The second liquid connection pipe (4) and the second gas connection pipe (5) are associated with the refrigeration-facility unit (60). The first gas connection pipe (3) for the indoor units (50) is connected to a first gas-side shutoff valve (91) of the heat source unit (10). The first liquid connection pipe (2) for the indoor units (50) is connected to a first liquid-side shutoff valve (92) of the heat source unit (10). The second gas connection pipe (5) for the refrigeration-facility unit (60) is connected to a second gas-side shutoff valve (93) of the heat source unit (10). The second liquid connection pipe (4) for the refrigeration-facility unit (60) is connected to a second liquid-side shutoff valve (94) of the heat source unit (10).

In the refrigerant circuit (6), a refrigerant circulates to perform a refrigeration cycle. The refrigerant in the refrigerant circuit (6) of the present embodiment is, for example, carbon dioxide. The refrigerant circuit (6) is configured to perform the refrigeration cycle so that the refrigerant has a pressure equal to or greater than the critical pressure.

Heat Source Unit

The heat source unit (10) is placed outside. The heat source unit (10) includes an outdoor fan (12) and an outdoor circuit (11). The outdoor circuit (11) includes a compression system (C), a flow path switching mechanism (30), an outdoor heat exchanger (13), an outdoor expansion valve (14), a receiver (15), a cooling heat exchanger (16), and an intercooler (17).

Compression System

The compression system (C) compresses a refrigerant. The compression system (C) includes a high-stage compressor (21), a first low-stage compressor (22), and a second low-stage compressor (23). Specifically, the compression system (C) constitutes a two-stage compression system, the high-stage compressor (21) constitutes a high-stage compression element, and the first low-stage compressor (22) and the second low-stage compressor (23) constitute a low-stage compression element.

The first low-stage compressor (22) and the second low-stage compressor (23) are connected to each other in parallel. The high-stage compressor (21) and the first low-stage compressor (22) are connected to each other in series. The high-stage compressor (21) and the second low-stage compressor (23) are connected to each other in series. The high-stage compressor (21), the first low-stage compressor (22), and the second low-stage compressor (23) are each a rotary compressor in which a motor drives a compression mechanism. The high-stage compressor (21), the first low-stage compressor (22), and the second low-stage compressor (23) are each configured as a variable capacity compressor having an adjustable operation frequency or number of revolutions.

The high-stage compressor (21) is connected to a high-stage suction pipe (21a) and a high-stage discharge pipe (21b). The first low-stage compressor (22) is connected to a first low-stage suction pipe (22a) and a first low-stage discharge pipe (22b). The second low-stage compressor (23) is connected to a second low-stage suction pipe (23a) and a second low-stage discharge pipe (23b). The high-stage suction pipe (21a) constitutes an intermediate pressure portion between the high-stage compressor (21) and low-stage compressors (22, 23).

The first low-stage suction pipe (22a) communicates with the refrigeration-facility unit (60). The first low-stage compressor (22) is a refrigeration-facility compressor associated with the refrigeration-facility unit (60). The second low-stage suction pipe (23a) communicates with the indoor units (50). The second low-stage compressor (23) is an indoor-side compressor associated with the indoor units (50).

Flow Path Switching Mechanism

The flow path switching mechanism (30) switches the flow path for the refrigerant. The flow path switching mechanism (30) includes a first pipe (31), a second pipe (32), a third pipe (33), a fourth pipe (34), a first three-way valve (TV1), and a second three-way valve (TV2). The inflow end of the first pipe (31) and the inflow end of the second pipe (32) are connected to the high-stage discharge pipe (21b). The first pipe (31) and the second pipe (32) are pipes on which the discharge pressure of the compression system (C) acts. The outflow end of the third pipe (33) and the outflow end of the fourth pipe (34) are connected to the second low-stage suction pipe (23a) of the second low-stage compressor (23). The third pipe (33) and the fourth pipe (34) are pipes on which the suction pressure of the compression system (C) acts.

The first three-way valve (TV1) has a first port (P1), a second port (P2), and a third port (P3). The first port (P1) of the first three-way valve (TV1) is connected to the outflow end of the first pipe (31) that is a high-pressure flow path. The second port (P2) of the first three-way valve (TV1) is connected to the inflow end of the third pipe (33) which is a low-pressure flow path. The third port (P3) of the first three-way valve (TV1) is connected to an indoor gas-side flow path (35).

The second three-way valve (TV2) has a first port (P1), a second port (P2), and a third port (P3). The first port (P1) of the second three-way valve (TV2) is connected to the outflow end of the second pipe (32) that is a high-pressure flow path. The second port (P2) of the second three-way valve (TV2) is connected to the inflow end of the fourth pipe (34) that is a low-pressure flow path. The third port (P3) of the second three-way valve (TV2) is connected to the outdoor gas-side flow path (36).

The first three-way valve (TV1) and the second three-way valve (TV2) are each an electric three-way valve. The three-way valves (TV1, TV2) are each configured to switch between the first state (the state indicated by a solid line in FIG. 1) and the second state (the state indicated by a dashed line in FIG. 1) separately. In the three-way valves (TV1, TV2) in the first state, the first port (P1) and the third port (P3) communicate with each other, and the second port (P2) is closed. In the three-way valves (TV1, TV2) in the second state, the second port (P2) and the third port (P3) communicate with each other, and the first port (P1) is closed.

Outdoor Heat Exchanger

The outdoor heat exchanger (13) constitutes a heat-source-side heat exchanger. The outdoor heat exchanger (13) is, for example, a fin-and-tube air heat exchanger. The outdoor fan (12) is arranged near the outdoor heat exchanger (13). The outdoor fan (12) transfers outdoor air. The outdoor heat exchanger (13) exchanges heat between the refrigerant flowing therethrough and the outdoor air transferred by the outdoor fan (12).

The gas end of the outdoor heat exchanger (13) is connected to an outdoor gas-side flow path (36). The liquid end of the outdoor heat exchanger (13) is connected to an outdoor flow path (O).

Outdoor Flow Path

The outdoor flow path (O) includes a first outdoor pipe (o1), a second outdoor pipe (o2), a third outdoor pipe (o3), a fourth outdoor pipe (o4), a fifth outdoor pipe (o5), a sixth outdoor pipe (o6), and a seventh outdoor pipe (o7). One end of the first outdoor pipe (o1) is connected to the liquid end of the outdoor heat exchanger (13). The other end of the first outdoor pipe (o1) is connected to one end of the second outdoor pipe (o2) and one end of the third outdoor pipe (o3). The other end of the second outdoor pipe (o2) is connected to the top of the receiver (15). One end of the fourth outdoor pipe (o4) is connected to the bottom of the receiver (15). The other end of the fourth outdoor pipe (o4) is connected to one end of the fifth outdoor pipe (o5) and the other end of the third outdoor pipe (o3). The other end of the fifth outdoor pipe (o5) is connected to the second liquid connection pipe (4) via the second liquid-side shutoff valve (94). One end of the sixth outdoor pipe (o6) is connected to an intermediate portion of the fifth outdoor pipe (o5). The other end of the sixth outdoor pipe (o6) is connected to the first liquid connection pipe (2) via the first liquid-side shutoff valve (92). One end of the seventh outdoor pipe (o7) is connected to an intermediate portion of the sixth outdoor pipe (o6). The other end of the seventh outdoor pipe (o7) is connected to an intermediate portion of the second outdoor pipe (o2).

Outdoor Expansion Valve

The outdoor expansion valve (14) is connected to the first outdoor pipe (o1). The outdoor expansion valve (14) is a decompression mechanism that decompresses the refrigerant. The outdoor expansion valve (14) is, for example, an electronic expansion valve having a variable opening degree.

Receiver

The receiver (15) constitutes a container that stores the refrigerant. In the receiver (15), the refrigerant is separated into a gas refrigerant and a liquid refrigerant. The top of the receiver (15) is connected to the other end of the second outdoor pipe (o2) and one end of a venting pipe (37). The other end of the venting pipe (37) is connected to an intermediate portion of an injection pipe (38). The venting pipe (37) is connected to a venting valve (39). The venting valve (39) is, for example, an electronic expansion valve having a variable opening degree.

Cooling Heat Exchanger

The cooling heat exchanger (16) cools the refrigerant (mainly the liquid refrigerant) separated in the receiver (15). The cooling heat exchanger (16) includes a first refrigerant flow path (16a) and a second refrigerant flow path (16b). The first refrigerant flow path (16a) is connected to an intermediate portion of the fourth outdoor pipe (o4). The second refrigerant flow path (16b) is connected to an intermediate portion of the injection pipe (38).

One end of the injection pipe (38) is connected to an intermediate portion of the fifth outdoor pipe (o5). The other end of the injection pipe (38) is connected to the high-stage suction pipe (21a) of the high-stage compressor (21). In other words, the other end of the injection pipe (38) is connected to an intermediate pressure portion of the compression system (C). The injection pipe (38) is provided with a decompression valve (40) upstream of the second refrigerant flow path (16b). The decompression valve (40) is, for example, an expansion valve having a variable opening degree.

In the cooling heat exchanger (16), heat is exchanged between the refrigerant flowing through the first refrigerant flow path (16a) and the refrigerant flowing through the second refrigerant flow path (16b). The refrigerant that has been decompressed at the decompression valve (40) flows through the second refrigerant flow path (16b). In this manner, the refrigerant flowing through the first refrigerant flow path (16a) is cooled in the cooling heat exchanger (16).

Intercooler

The intercooler (17) is connected to an intermediate flow path (41). One end of the intermediate flow path (41) is connected to the first low-stage discharge pipe (22b) of the first low-stage compressor (22), and the second low-stage discharge pipe (23b) of the second low-stage compressor (23). The other end of the intermediate flow path (41) is connected to the high-stage suction pipe (21a) of the high-stage compressor (21). In other words, the other end of the intermediate flow path (41) is connected to an intermediate pressure portion of the compression system (C).

The intercooler (17) is, for example, a fin-and-tube air heat exchanger. A cooling fan (17a) is arranged near the intercooler (17). The intercooler (17) exchanges heat between the refrigerant flowing therethrough and the outdoor air transferred by the cooling fan (17a).

Oil Separation Circuit

The outdoor circuit (11) includes an oil separation circuit (42). The oil separation circuit (42) includes an oil separator (43), a first oil return pipe (44), a second oil return pipe (45), and a third oil return pipe (46). The oil separator (43) is connected to the high-stage discharge pipe (21b) of the high-stage compressor (21). The oil separator (43) separates oil from the refrigerant discharged from the compression system (C). The inflow end of the first oil return pipe (44) communicates with the oil separator (43). The outflow end of the first oil return pipe (44) is connected to the first low-stage suction pipe (22a) of the first low-stage compressor (22). The inflow end of the second oil return pipe (45) communicates with the oil separator (43). The outflow end of the second oil return pipe (45) is connected to the inflow end of the intermediate flow path (41). The third oil return pipe (46) includes a main return pipe (46a), a refrigeration-facility branch pipe (46b), and an indoor-side branch pipe (46c). The inflow end of the main return pipe (46a) communicates with the oil separator (43). The outflow end of the main return pipe (46a) is connected to the inflow end of the refrigeration-facility branch pipe (46b) and the inflow end of the indoor-side branch pipe (46c). The outflow end of the refrigeration-facility branch pipe (46b) communicates with an oil reservoir inside a casing of the first low-stage compressor (22). The outflow end of the indoor-side branch pipe (46c) communicates with an oil reservoir inside the casing of the second low-stage compressor (23).

The first oil return pipe (44) is connected to a first oil level control valve (47a). The second oil return pipe (45) is connected to a second oil level control valve (47b) The refrigeration-facility branch pipe (46b) is connected to a third oil level control valve (47c). The indoor-side branch pipe (46c) is connected to a fourth oil level control valve (47d).

Oil separated in the oil separator (43) returns to the first low-stage compressor (22) via the first oil return pipe (44). Oil separated in the oil separator (43) returns to the high-stage compressor (21) via the second oil return pipe (45). Oil separated in the oil separator (43) returns to an oil reservoir in a casing of each of the first low-stage compressor (22) and the second low-stage compressor (23) via the third oil return pipe (46).

Check Valve

The outdoor circuit (11) has a first check valve (CV1), a second check valve (CV2), a third check valve (CV3), a fourth check valve (CV4), a fifth check valve (CV5), a sixth check valve (CV6), and a seventh check valve (CV7). The first check valve (CV1) is connected to the high-stage discharge pipe (21b). The second check valve (CV2) is connected to the first low-stage discharge pipe (22b). The third check valve (CV3) is connected to the second low-stage discharge pipe (23b). The fourth check valve (CV4) is connected to the second outdoor pipe (o2). The fifth check valve (CV5) is connected to the third outdoor pipe (o3). The sixth check valve (CV6) is connected to the sixth outdoor pipe (o6). The seventh check valve (CV7) is connected to the seventh outdoor pipe (o7). The check valves (CV1 to CV7) allow the refrigerant to flow in the directions indicated by the respective arrows shown in FIG. 1, and disallow the refrigerant to flow in the directions opposite thereto.

Indoor Unit

The indoor units (50) are utilization-side units placed in an indoor space. The indoor units (50) each include an indoor fan (52) and an indoor circuit (51). The liquid end of the indoor circuit (51) is connected to the first liquid connection pipe (2). The gas end of the indoor circuit (51) is connected to the first gas connection pipe (3).

The indoor circuit (51) includes an indoor expansion valve (53) and an indoor heat exchanger (54) in order from the liquid end to the gas end. The indoor expansion valve (53) is, for example, an electronic expansion valve having a variable opening degree. The indoor heat exchanger (54) is, for example, a fin-and-tube air heat exchanger. The indoor fan (52) is arranged near the indoor heat exchanger (54). The indoor fan (52) transfers indoor air. The indoor heat exchanger (54) exchanges heat between a refrigerant flowing therethrough and indoor air transferred by the indoor fan (52).

Refrigeration-Facility Unit

The refrigeration-facility unit (60) is a utilization-side unit that cools its internal space. The refrigeration-facility unit (60) includes a refrigeration-facility fan (62) and a refrigeration-facility circuit (61). The liquid end of the refrigeration-facility circuit (61) is connected to the second liquid connection pipe (4). The gas end of the refrigeration-facility circuit (61) is connected to the second gas connection pipe (5).

The refrigeration-facility circuit (61) includes a refrigeration-facility expansion valve (63) and a refrigeration-facility heat exchanger (64) in order from the liquid end to the gas end. The refrigeration-facility expansion valve (63) is configured as an electronic expansion valve having a variable opening degree, for example. The refrigeration-facility heat exchanger (64) is, for example, a fin-and-tube air heat exchanger. The refrigeration-facility fan (62) is arranged near the refrigeration-facility heat exchanger (64). The refrigeration-facility fan (62) transfers inside air. The refrigeration-facility heat exchanger (64) exchanges heat between the refrigerant flowing therethrough and inside air transferred by the refrigeration-facility fan (62).

Sensor

The refrigeration apparatus (1) includes various sensors. The sensors includes a high-pressure sensor (71), an intermediate-pressure sensor (72), a first low-pressure sensor (73), a second low-pressure sensor (74), a refrigerant temperature sensor (75), and an indoor temperature sensor (76).

The high-pressure sensor (71) detects a pressure of the refrigerant (a pressure of high-pressure refrigerant) discharged from the high-stage compressor (21). The intermediate-pressure sensor (72) detects a pressure of the refrigerant (a pressure of an intermediate-pressure refrigerant) sucked by the high-stage compressor (21). The first low-pressure sensor (73) detects a pressure of the refrigerant (a pressure of a low-pressure refrigerant) sucked by the first low-stage compressor (22). The second low-pressure sensor (74) detects a pressure of the refrigerant (a pressure of a low-pressure refrigerant) sucked by the second low-stage compressor (23). The refrigerant temperature sensor (75) detects a temperature of the refrigerant at the outlet of the indoor heat exchanger (54) serving as a radiator. The indoor temperature sensor (76) detects a temperature (indoor temperature) of indoor air inside a target space (indoor space) of the indoor unit (50).

Examples of physical quantities detected with other sensors (not shown) include the temperature of the high-pressure refrigerant, the temperature of the low-pressure refrigerant, the temperature of the intermediate-pressure refrigerant, the temperature of the refrigerant in the outdoor heat exchanger (13), the temperature of the refrigerant in the refrigeration-facility heat exchanger (64), the degree of superheat of the refrigerant sucked by the first low-stage compressor (22), the degree of superheat of the refrigerant sucked by the second low-stage compressor (23), the degree of superheat of the refrigerant discharged from each of the compressors (21, 22, 23), the temperature of the outdoor air, and the temperature of the inside air.

Pressure Switchgear

The first low-stage discharge pipe (22b) of the first low-stage compressor (22) is provided with a first high-pressure switchgear (82). When the pressure at the first low-stage discharge pipe (22b) increases and reaches a predetermined value (e.g., 5 MPa), the first high-pressure switchgear (82) causes the electric contact to open to pause the first low-stage compressor (22).

The second low-stage discharge pipe (23b) of the second low-stage compressor (23) is provided with a second high-pressure switchgear (83). When the pressure at the second low-stage discharge pipe (23b) increases and reaches a predetermined value (e.g., 5 MPa), the second high-pressure switchgear (83) causes the electric contact to open to pause the second low-stage compressor (23).

The high-stage discharge pipe (21b) of the high-stage compressor (21) is provided with a third high-pressure switchgear (81). When the pressure at the high-stage discharge pipe (21b) increases and reaches a predetermined value (e.g., 10 MPa), the third high-pressure switchgear (81) causes the electric contact to open to pause the high-stage compressor (21).

Controller

A controller (100), which is a control unit, includes a microcomputer mounted on a control board, and a memory device (specifically, a semiconductor memory) storing software for operating the microcomputer. The controller (100) controls various components of the refrigeration apparatus (1) based on an operation command and detection signals from the sensors. Controlling the various components by the controller (100) makes it possible to switch operations of the refrigeration apparatus (1). The controller (100) is connected to various sensors such as the high-pressure sensor (71), the components of the refrigerant circuit (6) such as the outdoor expansion valve (14), the high-pressure switchgears (81, 82, 83), and the like via communication lines (not shown).

Operation

The operation of the refrigeration apparatus (1) will be described in detail below. The refrigeration apparatus (1) performs a refrigeration-facility operation, a cooling operation, a cooling/refrigeration-facility operation, a heating operation, a heating/refrigeration-facility operation, a heating/refrigeration-facility heat recovery operation, a heating/refrigeration-facility residual heat operation, and a defrosting operation.

In the refrigeration-facility operation, the refrigeration-facility unit (60) operates, and the indoor units (50) are paused. In the cooling operation, the refrigeration-facility unit (60) is paused, and the indoor units (50) perform cooling. In the cooling/refrigeration-facility operation, the refrigeration-facility unit (60) operates, and the indoor units (50) perform cooling. In the heating operation, the refrigeration-facility unit (60) is paused, and the indoor units (50) perform heating. In each of the heating/refrigeration-facility operation, heating/refrigeration-facility heat recovery operation, and heating/refrigeration-facility residual heat operation, the refrigeration-facility unit (60) operates, and the indoor units (50) perform heating. In the defrosting operation, the refrigeration-facility unit (60) performs an operation to melt frost on the surface of the outdoor heat exchanger (13).

The heating/refrigeration-facility operation is performed under conditions where the heating capacity necessary for each indoor unit (50) is relatively large. The heating/refrigeration-facility residual heat operation is performed under conditions where the heating capacity necessary for each indoor unit (50) is relatively small. The heating/refrigeration-facility heat recovery operation is performed under conditions where the heating capacity necessary for each indoor unit (50) is between those in the heating/refrigeration-facility operation and the heating/refrigeration-facility residual heat operation (conditions where refrigeration-facility and heating are in balance).

Refrigeration-Facility Operation

Figure 2:
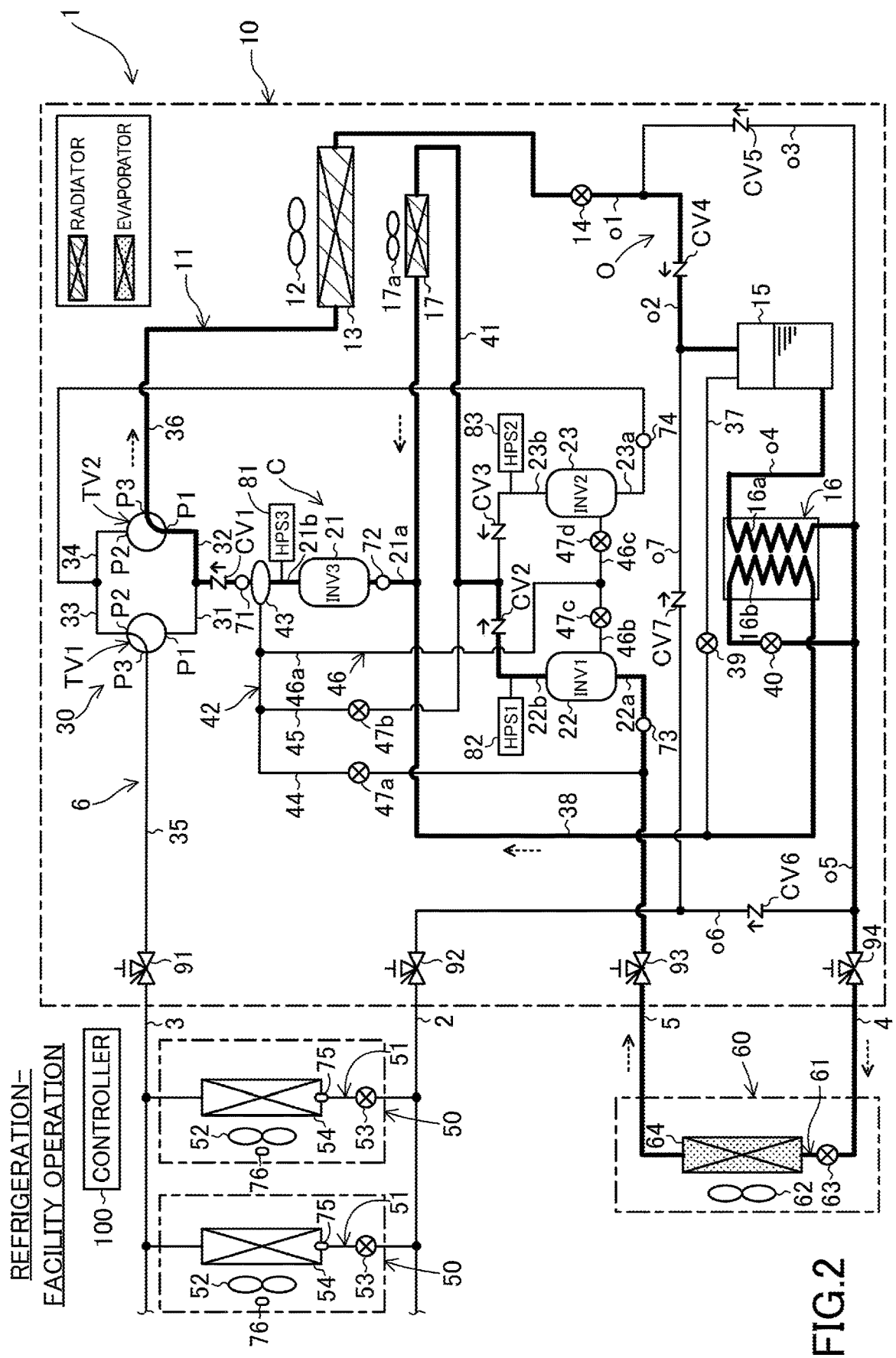
FIG. 2 corresponds to FIG. 1 and illustrates a flow of a refrigerant during a refrigeration-facility operation.

In the refrigeration-facility operation illustrated in FIG. 2, the first three-way valve (TV1) is in the second state, and the second three-way valve (TV2) is in the first state. The outdoor expansion valve (14) is open at a predetermined opening degree, the opening degree of the refrigeration-facility expansion valve (63) is controlled by superheat control, the indoor expansion valve (53) is fully closed, and the opening degree of the decompression valve (40) is controlled appropriately. The outdoor fan (12), the cooling fan (17a), and the refrigeration-facility fan (62) operate, and the indoor fan (52) is paused. The high-stage compressor (21) and the first low-stage compressor (22) operate, and the second low-stage compressor (23) is paused. In the refrigeration-facility operation, a refrigeration cycle where the refrigerant that has been compressed in the compression system (C) dissipates heat in the outdoor heat exchanger (13) and evaporates in the refrigeration-facility heat exchanger (64) is performed.

As illustrated in FIG. 2 (particularly the bold line), the refrigerant that has been compressed in the first low-stage compressor (22) is cooled in the intercooler (17), and is then sucked into the high-stage compressor (21). The refrigerant that has been compressed in the high-stage compressor (21) dissipates heat in the outdoor heat exchanger (13), flows through the receiver (15), and is then cooled in the cooling heat exchanger (16). The refrigerant that has been cooled in the cooling heat exchanger (16) is decompressed in the refrigeration-facility expansion valve (63), and then evaporates in the refrigeration-facility heat exchanger (64). As a result, the inside air is cooled. The refrigerant that has evaporated in the cooling heat exchanger (16) is sucked into the first low-stage compressor (22), and is then compressed again.

Cooling Operation

Figure 3:
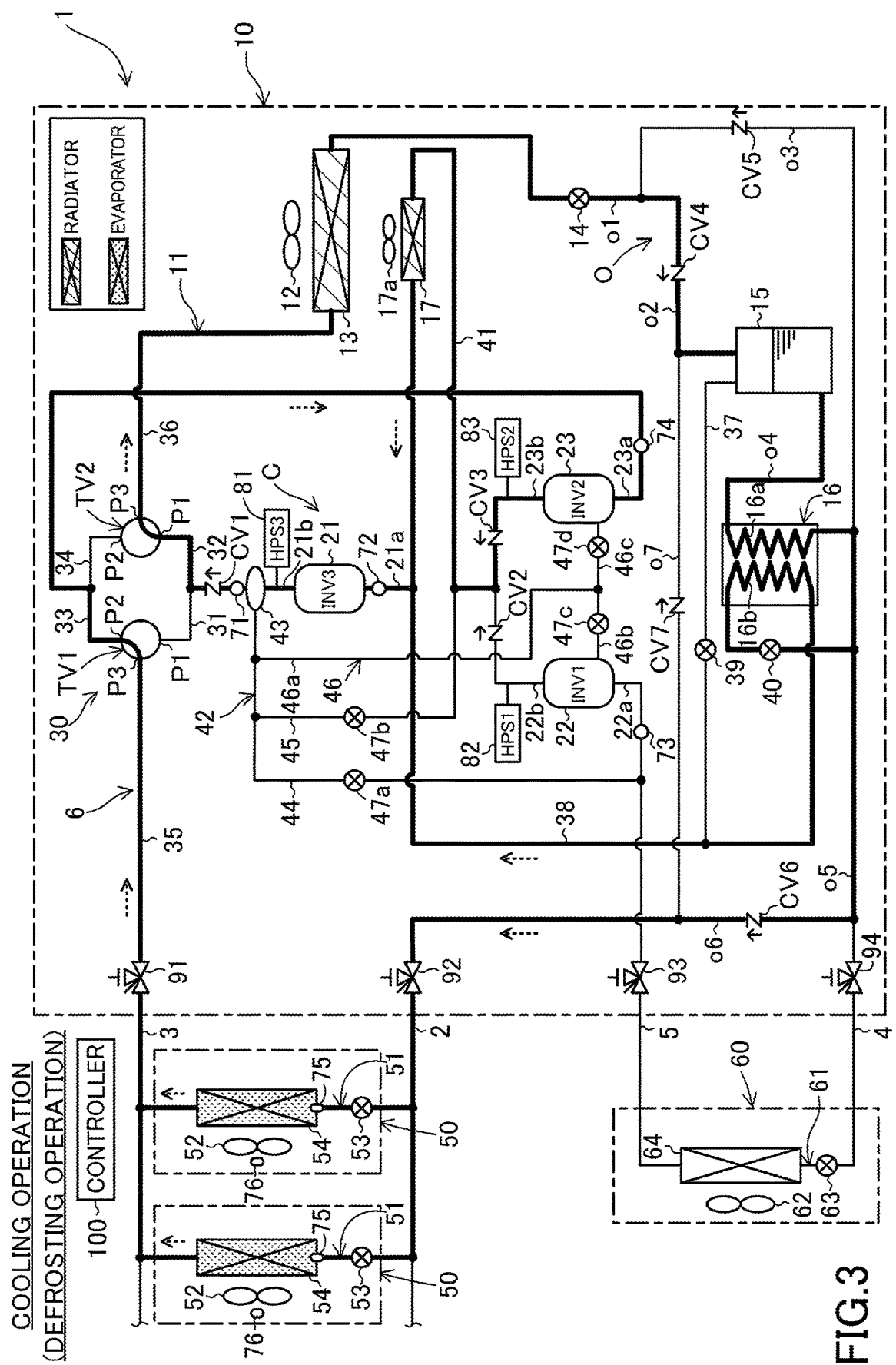
FIG. 3 corresponds to FIG. 1 and illustrates a flow of a refrigerant during a cooling operation.

In the cooling operation illustrated in FIG. 3, the first three-way valve (TV1) is in the second state, and the second three-way valve (TV2) is in the first state. The outdoor expansion valve (14) is open at a predetermined opening degree, the refrigeration-facility expansion valve (63) is fully closed, the opening degree of the indoor expansion valve (53) is controlled by control of the degree of superheat, and the opening degree of the decompression valve (40) is controlled appropriately. The outdoor fan (12), the cooling fan (17a), and the indoor fan (52) operate, and the refrigeration-facility fan (62) is paused. The high-stage compressor (21) and the second low-stage compressor (23) operate, and the first low-stage compressor (22) is paused. In the cooling operation, a refrigeration cycle where the refrigerant that has been compressed in the compression system (C) dissipates heat in the outdoor heat exchanger (13) and evaporates in the indoor heat exchanger (54) is performed.

As illustrated in FIG. 3 (particularly the bold line), the refrigerant that has been compressed in the second low-stage compressor (23) is cooled in the intercooler (17), and is then sucked into the high-stage compressor (21). The refrigerant that has been compressed in the high-stage compressor (21) dissipates heat in the outdoor heat exchanger (13), flows through the receiver (15), and is then cooled in the cooling heat exchanger (16). The refrigerant that has been cooled in the cooling heat exchanger (16) is decompressed in the indoor expansion valve (53), and then evaporates in the indoor heat exchanger (54). As a result, indoor air is cooled. The refrigerant that has evaporated in the indoor heat exchanger (54) is sucked into the second low-stage compressor (23), and is then compressed again.

Cooling/Refrigeration-Facility Operation

Figure 4:
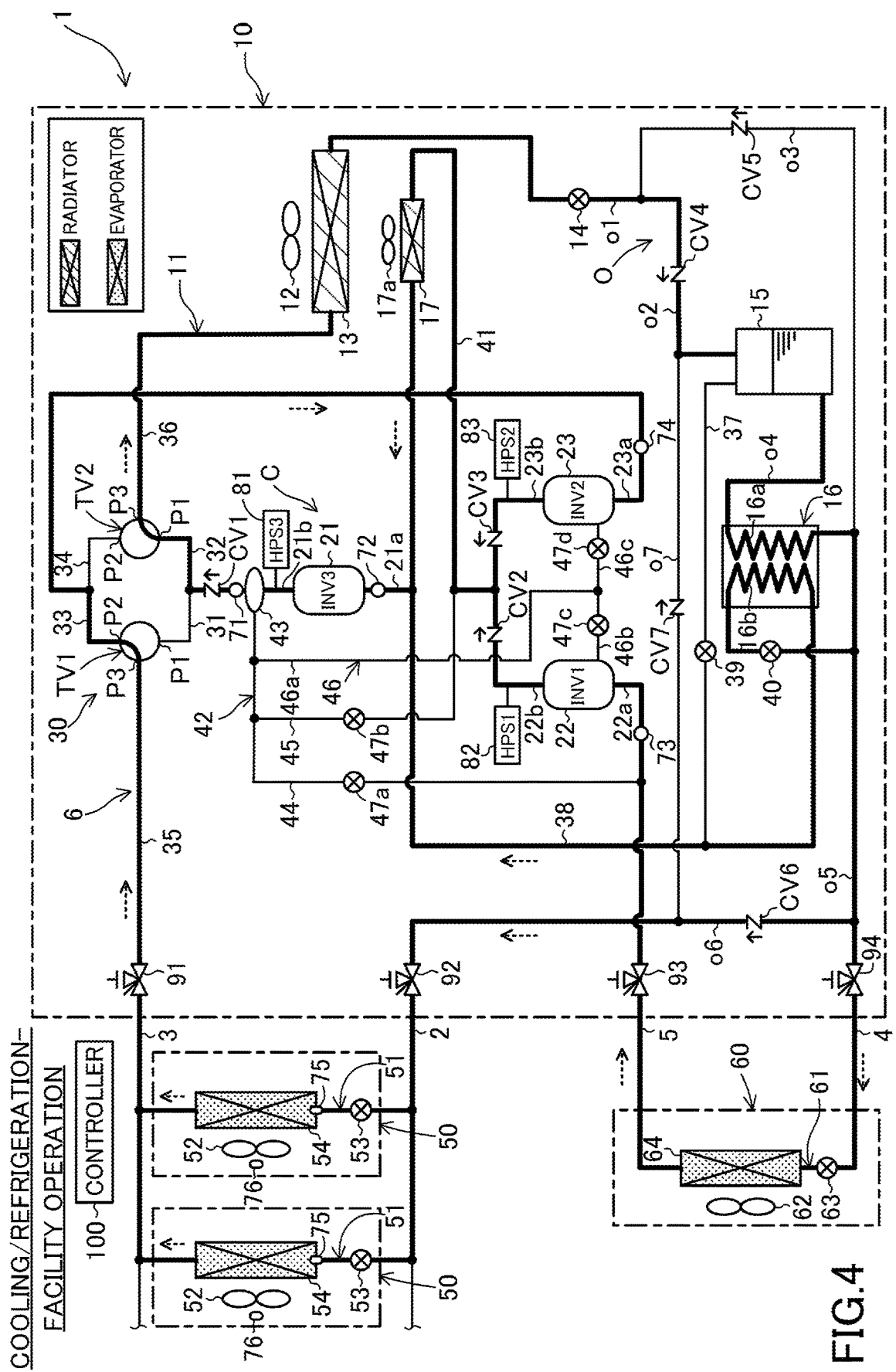
FIG. 4 corresponds to FIG. 1 and illustrates a flow of a refrigerant during a cooling/refrigeration-facility operation.

In the cooling/refrigeration-facility operation illustrated in FIG. 4, the first three-way valve (TV1) is in the second state, and the second three-way valve (TV2) is in the first state. The outdoor expansion valve (14) is open at a predetermined opening degree, the opening degrees of the refrigeration-facility expansion valve (63) and the indoor expansion valve (53) are controlled by superheat control, and the opening degree of the decompression valve (40) is controlled appropriately. The outdoor fan (12), the cooling fan (17a), the refrigeration-facility fan (62), and the indoor fan (52) operate. The high-stage compressor (21), the first low-stage compressor (22), and the second low-stage compressor (23) operate. In the cooling/refrigeration-facility operation, a refrigeration cycle where the refrigerant that has been compressed in the compression system (C) dissipates heat in the outdoor heat exchanger (13) and evaporates in the refrigeration-facility heat exchanger (64) and the indoor heat exchanger (54) is performed.

As illustrated in FIG. 4 (particularly the bold line), the refrigerant that has been compressed in each of the first low-stage compressor (22) and the second low-stage compressor (23) is cooled in the intercooler (17), and is then sucked into the high-stage compressor (21). The refrigerant that has been compressed in the high-stage compressor (21) dissipates heat in the outdoor heat exchanger (13), flows through the receiver (15), and is then cooled in the cooling heat exchanger (16). The refrigerant that has been cooled in the cooling heat exchanger (16) diverges into the refrigeration-facility unit (60) and the indoor units (50). The refrigerant that has been decompressed in the refrigeration-facility expansion valve (63) evaporates in the refrigeration-facility heat exchanger (64). The refrigerant that has evaporated in the refrigeration-facility heat exchanger (64) is sucked into the first low-stage compressor (22), and is then compressed again. The refrigerant that has been decompressed in the indoor expansion valve (53) evaporates in the indoor heat exchanger (54). The refrigerant that has evaporated in the indoor heat exchanger (54) is sucked into the second low-stage compressor (23), and is then compressed again.

Heating Operation

Figure 5:
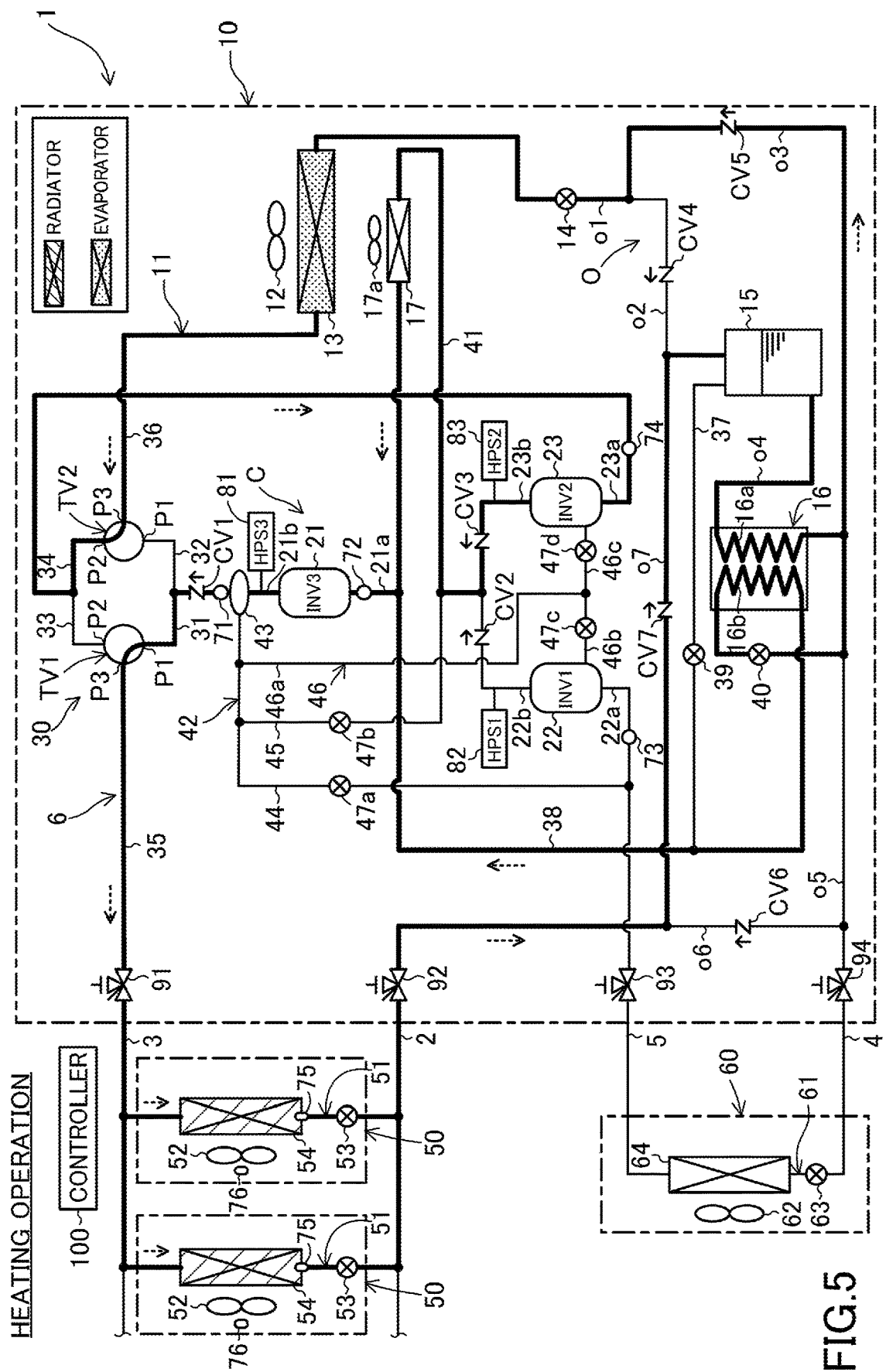
FIG. 5 corresponds to FIG. 1 and illustrates a flow of a refrigerant during a heating operation.

In the heating operation illustrated in FIG. 5, the first three-way valve (TV1) is in the first state, and the second three-way valve (TV2) is in the second state. The indoor expansion valve (53) is open at a predetermined opening degree, the refrigeration-facility expansion valve (63) is fully closed, the opening degree of the outdoor expansion valve (14) is controlled by superheat control, and the opening degree of the decompression valve (40) is controlled appropriately. The outdoor fan (12) and the indoor fan (52) operate, and the cooling fan (17a) and the refrigeration-facility fan (62) are paused. The high-stage compressor (21) and the second low-stage compressor (23) operate, and the first low-stage compressor (22) is paused. In the heating operation, a refrigeration cycle where the refrigerant that has been compressed in the compression system (C) dissipates heat in the indoor heat exchanger (54) and evaporates in the outdoor heat exchanger (13) is performed.

As illustrated in FIG. 5 (particularly the bold line), the refrigerant that has been compressed in the second low-stage compressor (23) is cooled in the intercooler (17), and is then sucked into the high-stage compressor (21). The refrigerant that has been compressed in the high-stage compressor (21) dissipates heat in the indoor heat exchangers (54). As a result, indoor air is heated. The refrigerant that has dissipated heat in the indoor heat exchanger (54) flows through the receiver (15), and is then cooled in the cooling heat exchanger (16). The refrigerant that has been cooled in the cooling heat exchanger (16) is decompressed in the outdoor expansion valve (14), and then evaporates in the outdoor heat exchanger (13). The refrigerant that has evaporated in the outdoor heat exchanger (13) is sucked into the second low-stage compressor (23), and is then compressed again.

Heating/Refrigeration-Facility Operation

Figure 6:
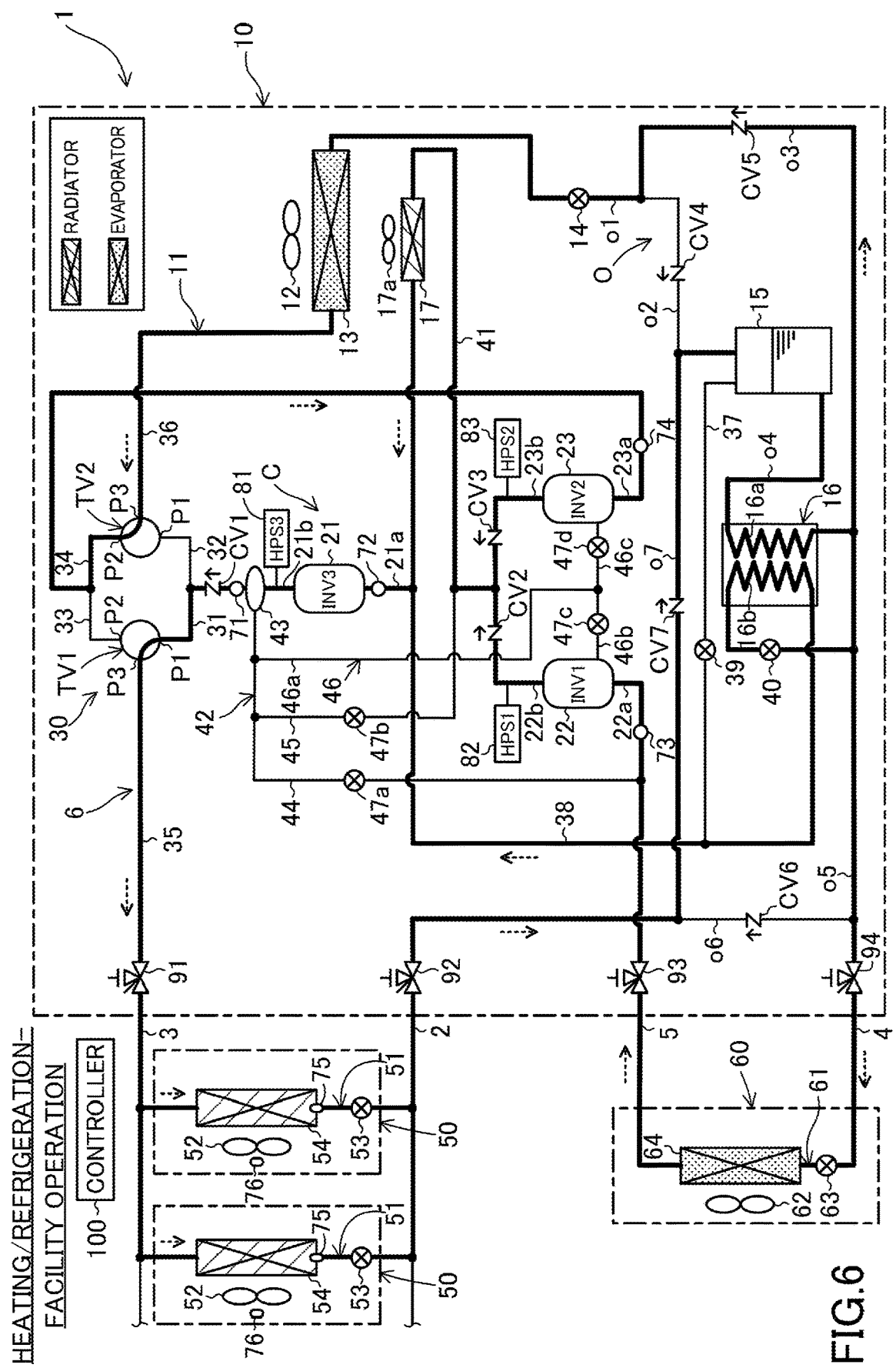
FIG. 6 corresponds to FIG. 1 and illustrates a flow of a refrigerant during a heating/refrigeration-facility operation.

In the heating/refrigeration-facility operation illustrated in FIG. 6, the first three-way valve (TV1) is in the first state, and the second three-way valve (TV2) is in the second state. The indoor expansion valve (53) is open at a predetermined opening degree, the opening degrees of the refrigeration-facility expansion valve (63) and the outdoor expansion valve (14) are controlled by superheat control, and the opening degree of the decompression valve (40) is controlled appropriately. The outdoor fan (12), the cooling fan (17a), the refrigeration-facility fan (62), and the indoor fan (52) operate. The high-stage compressor (21), the first low-stage compressor (22), and the second low-stage compressor (23) operate. In the heating/refrigeration-facility operation, a refrigeration cycle where the refrigerant that has been compressed in the compression system (C) dissipates heat in the indoor heat exchanger (54) and evaporates in the refrigeration-facility heat exchanger (64) and the outdoor heat exchanger (13) is performed.

As illustrated in FIG. 6 (particularly the bold line), the refrigerant that has been compressed in each of the first low-stage compressor (22) and the second low-stage compressor (23) is cooled in the intercooler (17), and is then sucked into the high-stage compressor (21). The refrigerant that has been compressed in the high-stage compressor (21) dissipates heat in the indoor heat exchangers (54). As a result, indoor air is heated. The refrigerant that has dissipated heat in the indoor heat exchanger (54) flows through the receiver (15), and is then cooled in the cooling heat exchanger (16). Part of the refrigerant that has been cooled in the cooling heat exchanger (16) is decompressed in the outdoor expansion valve (14), and then evaporates in the outdoor heat exchanger (13). The refrigerant that has evaporated in the outdoor heat exchanger (13) is sucked into the second low-stage compressor (23), and is then compressed again. The remaining refrigerant that has been cooled in the cooling heat exchanger (16) is decompressed in the refrigeration-facility expansion valve (63), and then evaporates in the refrigeration-facility heat exchanger (64). As a result, the inside air is cooled. The refrigerant that has evaporated in the refrigeration-facility heat exchanger (64) is sucked into the first low-stage compressor (22), and is then compressed again.

Heating/Refrigeration-Facility Heat Recovery Operation

Figure 7:
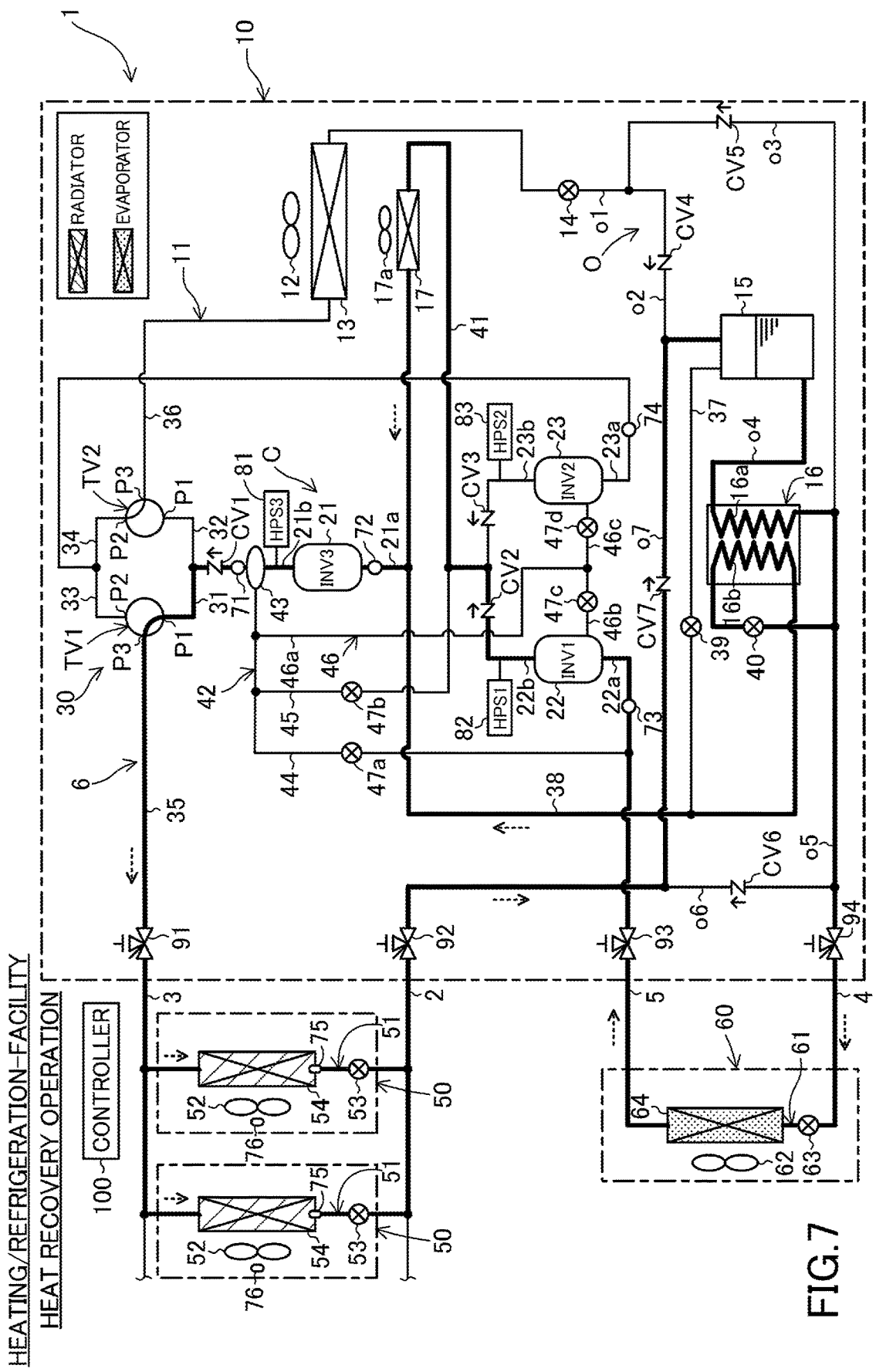
FIG. 7 corresponds to FIG. 1 and illustrates a flow of a refrigerant during a heating/refrigeration-facility heat recovery operation.

In the heating/refrigeration-facility heat recovery operation illustrated in FIG. 7, the first three-way valve (TV1) is in the first state, and the second three-way valve (TV2) is in the second state. The indoor expansion valve (53) is open at a predetermined opening degree, the outdoor expansion valve (14) is fully closed, the opening degree of the refrigeration-facility expansion valve (63) is controlled by superheat control, and the opening degree of the decompression valve (40) is controlled appropriately. The indoor fan (52) and the refrigeration-facility fan (62) operate, and the cooling fan (17a) and the outdoor fan (12) are paused. The high-stage compressor (21) and the first low-stage compressor (22) operate, and the second low-stage compressor (23) is paused. In heating/refrigeration-facility heat recovery operation, a refrigeration cycle where the refrigerant that has been compressed in the compression system (C) dissipates heat in the indoor heat exchanger (54) and evaporates in the refrigeration-facility heat exchanger (64), and the outdoor heat exchanger (13) is substantially paused is performed.

As illustrated in FIG. 7 (particularly the bold line), the refrigerant that has been compressed in the first low-stage compressor (22) is cooled in the intercooler (17), and is then sucked into the high-stage compressor (21). The refrigerant that has been compressed in the high-stage compressor (21) dissipates heat in the indoor heat exchangers (54). As a result, indoor air is heated. The refrigerant that has dissipated heat in the indoor heat exchanger (54) flows through the receiver (15), and is then cooled in the cooling heat exchanger (16). The refrigerant that has been cooled in the cooling heat exchanger (16) is decompressed in the refrigeration-facility expansion valve (63), and then evaporates in the refrigeration-facility heat exchanger (64). The refrigerant that has evaporated in the refrigeration-facility heat exchanger (64) is sucked into the first low-stage compressor (22), and is then compressed again.

Heating/Refrigeration-Facility Residual Heat Operation

Figure 8:
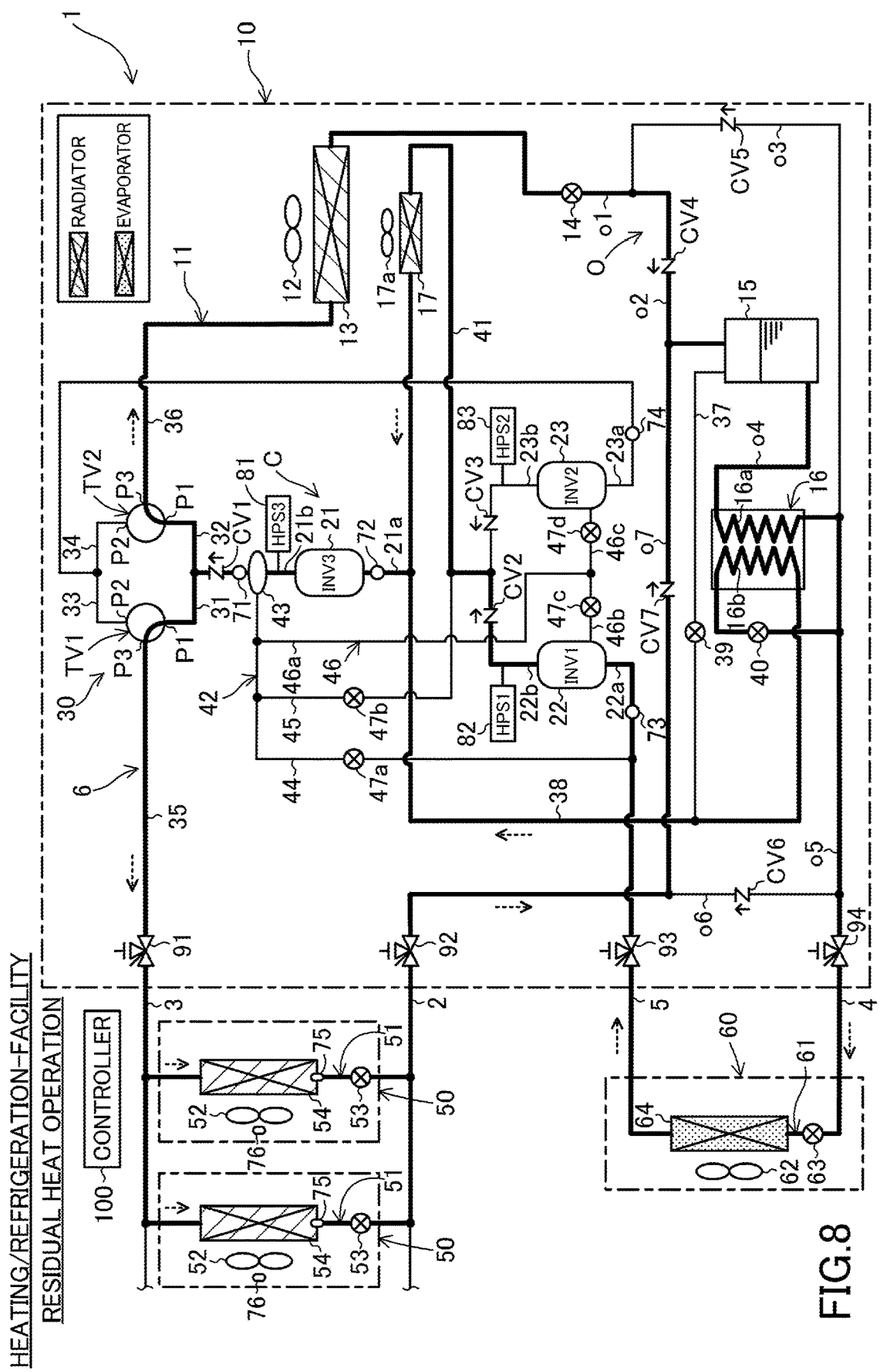
FIG. 8 corresponds to FIG. 1 and illustrates a flow of a refrigerant during a heating/refrigeration-facility residual heat operation.

In the heating/refrigeration-facility residual heat operation illustrated in FIG. 8, the first three-way valve (TV1) is in the first state, and the second three-way valve (TV2) is in the first state. The indoor expansion valve (53) and the outdoor expansion valve (14) are open at predetermined opening degrees, the opening degree of the refrigeration-facility expansion valve (63) is controlled by superheat control, and the opening degree of the decompression valve (40) is controlled appropriately. The outdoor fan (12), the cooling fan (17a), the refrigeration-facility fan (62), and the indoor fan (52) operate. The high-stage compressor (21) and the first low-stage compressor (22) operate, and the second low-stage compressor (23) is paused. In the heating/refrigeration-facility residual heat operation, a refrigeration cycle where the refrigerant that has been compressed in the compression system (C) dissipates heat in the indoor heat exchanger (54) and the outdoor heat exchanger (13) and evaporates in the refrigeration-facility heat exchanger (64) is performed.

As illustrated in FIG. 8 (particularly the bold line), the refrigerant that has been compressed in the first low-stage compressor (22) is cooled in the intercooler (17), and is then sucked into the high-stage compressor (21). Part of the refrigerant that has been compressed in the high-stage compressor (21) dissipates heat in the outdoor heat exchanger (13). The remaining refrigerant that has been compressed in the high-stage compressor (21) dissipates heat in the indoor heat exchanger (54). As a result, indoor air is heated. The refrigerant that has dissipated heat in the outdoor heat exchanger (13) and the refrigerant that has dissipated heat in the indoor heat exchanger (54) merge together and flows through the receiver (15), and are then cooled in the cooling heat exchanger (16). The refrigerant that has been cooled in the cooling heat exchanger (16) is decompressed in the refrigeration-facility expansion valve (63), and then evaporates in the refrigeration-facility heat exchanger (64). As a result, the inside air is cooled. The refrigerant that has evaporated in the refrigeration-facility heat exchanger (64) is sucked into the first low-stage compressor (22), and is then compressed again.

Defrosting Operation

In the defrosting operation, the operation which is the same as the cooling operation illustrated in FIG. 3 is performed. In the defrosting operation, the refrigerant that has been compressed in the second low-stage compressor (23) and the high-stage compressor (21) dissipate heat in the outdoor heat exchanger (13). As a result, the frost on the surface of the outdoor heat exchanger (13) is heated from the inside. The refrigerant used to defrost the outdoor heat exchanger (13), as mentioned above, evaporates in the indoor heat exchanger (54), is then sucked into the second low-stage compressor (23), and is compressed again.

Control at Activation of Pressure Switchgear

If the entire compression system is paused as in a conventional example at the time when the pressure switchgear provided in the discharge pipe of the low-stage compressor constituting the heat source unit is activated in response to an abnormal rise of the pressure at the discharge pipe of the low-stage compressor, damage to the compression system is substantially prevented, but there is a problem that the pressure at the discharge pipe of the low-stage compressor is kept high, making it impossible to restore the compression system quickly.

In consideration of such a problem, when the low-stage compressor (22, 23) is paused in response to the activation of the pressure switchgear (82, 83) of the low-stage compressor (22, 23), the heat source unit (10) of the present embodiment performs a restoration operation where the high-stage compressor (21) operates while the low-stage compressor (22, 23) is kept paused, to reduce the pressure at the discharge pipe (22b, 23b) of the low-stage compressor (22, 23). In the restoration operation, the high-stage compressor (21) may be restarted after being paused once after the pressure switchgear (82, 83) is activated. The high-stage compressor (21) may be restarted after, for example, the venting valve (39) is open and the suction pressure and the discharge pressure of the high-stage compressor (21) are equalized using the venting pipe (37) and the injection pipe (38) as pressure equalization circuits (37, 38). In this case, the venting valve (39) may be kept open after the suction pressure and the discharge pressure of the high-stage compressor (21) are equalized.

Advantages of Embodiment

The heat source unit (10) of the present embodiment described above performs a restoration operation where the high-stage compressor (21) operates while the low-stage compressor (22, 23) is kept paused when the low-stage compressor (22, 23) is paused in response to the activation of the pressure switchgear (82, 83) of the low-stage compressor (22, 23). This allows refrigerant gas remaining in the discharge pipe (22b, 23b) of the low-stage compressor (22, 23) to be sucked by the high-stage compressor (21). Accordingly, the pressure at the discharge pipe (22b, 23b) of the low-stage compressor (22, 23) can be reduced quickly to a level that allows the system restoration.

In the heat source unit (10) of the present embodiment, the high-stage compressor (21) is paused once after activation of the pressure switchgear (82, 83), and is then restarted. This allows the high-stage compressor (21) to be operated after confirming that the high-stage compressor (21) has no pressure abnormality and the like.

The heat source unit (10) of the present embodiment further includes a pressure equalization circuit (37, 38) configured to equalize the suction pressure and the discharge pressure of the high-stage compressor (21) after the high-stage compressor (21) is paused and before the high-stage compressor (21) is restarted. This facilitates restart of the high-stage compressor (21). In this case, if the pressure equalization circuit (37, 38) has a venting pipe (37), complication of the refrigerant circuit (6) can be avoided. When the venting valve (39) is kept open after the suction pressure and the discharge pressure of the high-stage compressor (21) are equalized, the receiver (15) can be vented after the system restoration.

If carbon dioxide is used as a refrigerant in the heat source unit (10) of the present embodiment, the pressure at the discharge pipe (22b, 23b) of the low-stage compressor (22, 23) can be reduced quickly while the environmental load is reduced. In contrast, if carbon dioxide is used as a refrigerant in a commonly used heat source unit, the pressure of the refrigerant cannot be expected to be reduced to a level at which the system can be restored by the gas cooler (radiator) with the refrigerant not circulated, unlike the case where the refrigerant is condensed at a critical point or less.

In the refrigeration apparatus (1) including the heat source unit (10) according to the present embodiment, the time required to restore the compression system (C) after when the pressure switchgear (82, 83) of the low-stage compressor (22, 23) is activated is shortened. Thus, damage to the utilization-side unit such as the refrigeration-facility unit (60) is reduced.

EXAMPLE

FIG. 9 is a flowchart showing an example of operation from activation of the pressure switchgear (82, 83) of the low-stage compressor (22, 23) in the heat source unit (10) according to this embodiment to restoration of the compression system (C).

First, in step S101, the controller (100) checks the operating state of the first high-pressure switchgear (82) (hereinafter also referred to as "HPS1") or the second high-pressure switchgear (83) (hereinafter also referred to as "HPS2"), and if neither HPS1 nor 2 is operating, the compression system (C) continuously performs normal operation in step S102.

On the other hand, if at least one of the HPS1 or HPS2 is operating, the controller (100) pauses the first low-stage compressor (22) (hereinafter also referred to as "INV1"), the second low-stage compressor (23) (hereinafter also referred to as "INV2"), and the high-stage compressor (21) (hereinafter also referred to as "INV3") in step S103. In this case, the low-stage compressor with its pressure switchgear activated may be paused by operation of the pressure switchgear. Depending on the operating mode, the heat source unit (10) may include a low-stage compressor that is paused from the beginning.

Subsequently, after a lapse of a certain period of time, in step S104, the controller (100) checks the operating state of the third high-pressure switchgear (81) (hereinafter also referred to as "HPS3") of the high-stage compressor (21), and if HPS3 is operating, INV1 to INV3 are kept paused in step S105.

If HPS3 is not operating, in step S106, the controller (100) opens the venting valve (39) of the venting pipe (37) constituting the pressure equalization circuit (37, 38) to equalize the suction pressure and the discharge pressure of the INV3.

Then, in step S107, the controller (100) checks whether turning ON of a cooling thermostat or a refrigeration-facility thermostat is requested, and if at least one of them is requested, the controller (100) sets the first three-way valve (TV1) to be in the second state (OFF), and the second three-way valve (TV2) to be in the first state (ON) in step S108.

On the other hand, if none of the turning on of a cooling thermostat and a refrigeration-facility thermostat is requested, the controller (100) checks whether turning ON of a heating thermostat is requested in step S109. If turning ON of the heating thermostat is not requested, the controller (100) performs step S108 mentioned above at the time when the elapsed time after pausing INV1 to INV3 exceeds predetermined time. If turning ON of the heating thermostat is requested, the controller (100) sets the first three-way valve (TV1) to be in the first state (ON), and the second three-way valve (TV2) to be in the second state (OFF) in step S110.

After setting the first three-way valve (TV1) and the second three-way valve (TV2), the controller (100) activates necessary fan(s) among the outdoor fan (12), cooling fan (17a), refrigeration-facility fan (62), and indoor fan (52) according to the operating mode in step S111.

Next, in step S112, the controller (100) gives an operation instruction to the INV3 (high-stage compressors (21)). Here, the high-stage compressor (21) has, for example, the five-stage revolution speed (operation frequency) mode (N3), and initially activates INV3 at the lowest revolution speed N3=1.

Next, in step S113, the controller (100) checks whether the intermediate pressure MP (equal to the pressure at the discharge pipe (22b, 23b) of the low-stage compressor (22, 23)), which is the output from the intermediate-pressure sensor (72), has fallen below a predetermined value (e.g., 5 MPa), or whether N3 has reached the highest rotation level 5. If none of the conditions is satisfied, the controller (100) sets N3 of INV3 to be raised by one level in step S114, and sets the revolution speed mode on INV3 in step S112. The controller (100) repeatedly performs the process until the intermediate pressure MP falls below 5 MPa, or N3 reaches level 5 in step S113.

When the intermediate pressure MP falls below 5 MPa, or N3 reaches level 5 in step S113, the controller (100) checks whether the turning ON of the cooling thermostat, refrigeration-facility thermostat, or heating thermostat is requested in step S115. When turning ON of any one of the cooling thermostat, refrigeration-facility thermostat, and heating thermostat is requested, the controller (100) restarts at least one of INV1 or INV2 according to the operating mode in step S116. Accordingly, the compression system (C) is restored. When turning ON of none of the cooling thermostat, refrigeration-facility thermostat, and heating thermostat is requested in step S115, the controller (100) pauses INV3 in step S117. Accordingly, subsequent restart can be performed promptly.

Other Embodiments

In the embodiment, the high-stage compressor (21), the first low-stage compressor (22), and the second low-stage compressor (23) constitute the compression system (C), but the compression system (C) may have one low-stage compressor or three or more low-stage compressors.

In the embodiment, the indoor units (50) configured to perform air-conditioning of an indoor space and a refrigeration-facility unit (60) configured to cool inside air are used as utilization-side units constituting the refrigeration apparatus (1) together with the heat source unit (10). However, it goes without saying that the type of the utilization-side units is not particularly limited. For example, a heating cabinet may be used in place of the refrigeration-facility unit (60).

In the embodiment, an air heat exchanger that exchanges heat between air and a refrigerant is used as the indoor heat exchanger (54) of each indoor unit (50). However, the indoor heat exchanger (54) may be a heating heat exchanger that heats water and brine by using the refrigerant.

Further, in the embodiment, two three-way valves (TV1) and (TV2) are used as the flow path switching mechanisms (30) of the heat source unit (10). However, two four-way switching valves or a combination of a plurality of electro-magnetic valves and flow rate control valves may be used in place of the two three-way valves (TV1) and (TV2).

In Example shown in FIG. 9, when the pressure switchgear (82, 83) of the low-stage compressor (22, 23) is activated, the high-stage compressor (21) is paused once and is then restarted, but alternatively, the high-stage compressor (21) may be continuously operating without pausing.

In Example shown in FIG. 9, the venting pipe (37) and the injection pipe (38) are used as the pressure equalization circuits (37, 38) configured to equalize the suction pressure and the discharge pressure of the high-stage compressor (21) before restart of the high-stage compressor (21). However, the configuration of the equalization circuit is not particularly limited as long as being a circuit that bypasses the low-stage compressor (22, 23). For example, the bypass circuit which directly connect between the first low-stage suction pipe (22*a*) and the first low-stage discharge pipe (22*b*) of the first low-stage compressor (22), and a bypass circuit which directly connect between the second low-stage suction pipe (23*a*) and the second low-stage discharge pipe (23*b*) of the second low-stage compressor (23) can equalize the suction pressure and the discharge pressure of the high-stage compressor (21) before restart of the high-stage compressor (21).

While the embodiment, an example, and variations have been described above, it will be understood that various changes in form and details can be made without departing from the spirit and scope of the claims. The above embodiment, an example, and variations may be appropriately combined or replaced as long as the functions of the target of the present disclosure are not impaired. In addition, the expressions of "first," "second," . . . described above are used to distinguish the terms to which these expressions are given, and do not limit the number and order of the terms.

INDUSTRIAL APPLICABILITY

As can be seen from the foregoing description, the present disclosure is useful for a heat source unit and a refrigeration apparatus.

EXPLANATION OF REFERENCES

1 Refrigeration Apparatus
2 First Liquid Connection Pipe
3 First Gas Connection Pipe
4 Second Liquid Connection Pipe
5 Second Gas Connection Pipe
6 Refrigerant Circuit
10 Heat Source Unit
11 Outdoor Circuit
12 Outdoor Fan
13 Outdoor Heat Exchanger
14 Outdoor Expansion Valve
15 Receiver
16 Cooling Heat Exchanger
16*a* First Refrigerant Flow Path
16*b* Second Refrigerant Flow Path
17 Intercooler
17*a* Cooling Fun
21 High-Stage Compressor (High-Stage Compression Element)
21*a* High-Stage Suction Pipe
21*b* High-Stage Discharge Pipe
22 First Low-Stage Compressor (Low-Stage Compression Element)
22*a* First Low-Stage Suction Pipe
22*b* First Low-Stage Discharge Pipe
23 Second Low-Stage Compressor (Low-Stage Compression Element)
23*a* Second Low-Stage Suction Pipe
23*b* Second Low-Stage Discharge Pipe
30 Flow Path Switching Mechanism
31 First Pipe
32 Second Pipe
33 Third Pipe
34 Fourth Pipe
35 Indoor Gas-Side Flow Path
36 Outdoor Gas-Side Flow Path
37 Venting Pipe
38 Injection Pipe
39 Venting Valve
40 Decompression Valve
41 Intermediate Flow Path
42 Oil Separation Circuit
43 Oil Separator
44 First Oil Return Pipe
45 Second Oil Return Pipe
46 Third Oil Return Pipe
46*a* Main Return Pipe
46*b* Refrigeration-Facility Branch Pipe
46*c* Indoor-Side Branch Pipe
47*a* First Oil Level Control Valve
47*b* Second Oil Level Control Valve
47*c* Third Oil Level Control Valve
47*d* Fourth Oil Level Control Valve
50 Indoor Unit (Utilization-Side Unit)
51 Indoor Circuit
52 Indoor Fan
53 Indoor Expansion Valve
54 Indoor Heat Exchanger
60 Refrigeration-Facility Unit (Utilization-Side Unit)
61 Refrigeration-Facility Circuit
62 Refrigeration-Facility Fan
63 Refrigeration-Facility Expansion Valve
64 Refrigeration-Facility Heat Exchanger
71 High-Pressure Sensor
72 Intermediate-Pressure Sensor
73 First Low-Pressure Sensor
74 Second Low-Pressure Sensor
75 Refrigerant Temperature Sensor
76 Indoor Temperature Sensor
81 Third High-Pressure Switchgear
82 First High-Pressure Switchgear
83 Second High-Pressure Switchgear
91 First Gas-Side Shutoff Valve
92 First Liquid-Side Shutoff Valve
93 Second Gas-Side Shutoff Valve
94 Second Liquid-Side Shutoff Valve
100 Controller
C Compression System
TV1 First Three-Way Valve
TV2 Second Three-Way Valve
P1 First Port
P2 Second Port
P3 Third Port
O Outdoor Flow Path
o1 First Outdoor Pipe
o2 Second Outdoor Pipe
o3 Third Outdoor Pipe
o4 Fourth Outdoor Pipe
o5 Fifth Outdoor Pipe
o6 Sixth Outdoor Pipe
o7 Seventh Outdoor Pipe
CV1 First Check Valve
CV2 Second Check Valve
CV3 Third Check Valve
CV4 Fourth Check Valve
CV5 Fifth Check Valve CV6 Sixth Check Valve
CV7 Seventh Check Valve

The invention claimed is:

1. A heat source unit constituting a refrigeration apparatus by being connected to a utilization-side unit, the heat source unit comprising:
a low-stage compression element; a high-stage compression element; a heat exchanger; and a controller, wherein
the low-stage compression element has a discharge pipe provided with a pressure switchgear,
the high-stage compression element compresses a refrigerant discharged from the low-stage compression element,
the controller is configured to pause an operation of the low-stage compression element in response to activation of the pressure switchgear, and pause an operation of the high-stage compression element once and restart the operation of the high-stage compression element while the operation of the low-stage compression element is kept paused, thereby allowing refrigerant remaining in the discharge pipe of the low-stage compression element to be sucked by the high-stage compression element so as to reduce the pressure at the discharge pipe of the low-stage compressor element before restarting the low-stage compression element.

2. The heat source unit of claim 1, further comprising:
a pressure equalization circuit configured to equalize a suction pressure and a discharge pressure of the high-stage compression element after the high-stage compression element is paused and before the high-stage compression element is restarted.

3. The heat source unit of claim 2, further comprising:
a receiver provided between the heat exchanger and a liquid-side shutoff valve connected to the utilization-side unit, wherein
the pressure equalization circuit includes a venting pipe for the receiver.

4. The heat source unit of claim 3, wherein
a valve provided in the venting pipe is kept open after the suction pressure and the discharge pressure of the high-stage compression element are equalized.

5. The heat source unit of claim 1, wherein
the refrigerant is carbon dioxide.

6. The heat source unit of claim 2, wherein
the refrigerant is carbon dioxide.

7. The heat source unit of claim 3, wherein
the refrigerant is carbon dioxide.

8. The heat source unit of claim 4, wherein
the refrigerant is carbon dioxide.

9. A refrigeration apparatus comprising the heat source unit of claim 1.

10. A refrigeration apparatus comprising the heat source unit of claim 2.

11. A refrigeration apparatus comprising the heat source unit of claim 3.

12. A refrigeration apparatus comprising the heat source unit of claim 4.

13. A refrigeration apparatus comprising the heat source unit of claim 5.

* * * * *